(12) United States Patent
Chahal et al.

(10) Patent No.: US 11,047,088 B2
(45) Date of Patent: Jun. 29, 2021

(54) TEST METHOD AND DEVICE FOR EVALUATING TEXTILE FABRIC COVERAGE

(71) Applicant: Target Brands, Inc., Minneapolis, MN (US)

(72) Inventors: Rajneet Kaur Chahal, North Oaks, MN (US); Stacy Lee Abel, Champlin, MN (US); Terrence Joseph Hornsby, Minneapolis, MN (US); Audra Hunter, Prior Lake, MN (US)

(73) Assignee: Target Brands, Inc., Minneapolis, MN (US)

( * ) Notice: Subject to any disclaimer, the term of this patent is extended or adjusted under 35 U.S.C. 154(b) by 24 days.

(21) Appl. No.: 16/679,566

(22) Filed: Nov. 11, 2019

(65) Prior Publication Data
US 2020/0232154 A1 Jul. 23, 2020

Related U.S. Application Data

(60) Provisional application No. 62/795,823, filed on Jan. 23, 2019.

(51) Int. Cl.
*G01N 21/59* (2006.01)
*D06H 3/08* (2006.01)
*G01N 21/898* (2006.01)

(52) U.S. Cl.
CPC .............. *D06H 3/08* (2013.01); *G01N 21/59* (2013.01); *G01N 21/8983* (2013.01)

(58) Field of Classification Search
CPC ....... D06H 3/08; G01N 21/59; G01N 21/8983
USPC .......................................................... 356/430
See application file for complete search history.

(56) References Cited

U.S. PATENT DOCUMENTS

| | | | | |
|---|---|---|---|---|
| 3,001,080 | A | * 9/1961 | Neil | .................... G01N 21/8901 250/559.04 |
| 3,448,279 | A | 6/1969 | Lindemann et al. | |
| 4,124,300 | A | * 11/1978 | Mead | ........................ D06H 3/08 250/559.01 |
| 4,302,496 | A | * 11/1981 | Donovan | ................ B32B 27/12 428/196 |

(Continued)

OTHER PUBLICATIONS

"Use of Spectrophotometers for Testing the Textile Pigments", Color Measurement Solutions, Testronix Instruments, Aug. 3, 2018. https://www.testronixinstruments.com/blog/use-of-spectrophotometers-for-testing-the-textile-pigments/page-news-single.html (Year: 2018).*

(Continued)

*Primary Examiner* — Roy M Punnoose
(74) *Attorney, Agent, or Firm* — Amanda M. Prose; Westman, Champlin & Koehler, P.A.

(57) ABSTRACT

A method of and device for testing and a scale for evaluating a textile for use in an article of clothing constructed of the textile. The method comprises positioning a textile sample within a path of a generated beam of light and measuring the amount of light transmitted through the sample. The amount of light transmitted through the sample is compared to a standardized scale for evaluating the amount of coverage provided by the sample for the (Continued)

textiles fitness for use in the article of clothing. The articles of clothing may be articles of swimwear, athletic wear, or athleisure wear.

17 Claims, 5 Drawing Sheets

(56) References Cited

U.S. PATENT DOCUMENTS

| | | | | |
|---|---|---|---|---|
| 4,952,062 | A | * | 8/1990 | Bean, III .............. D06H 3/08 139/1 B |
| 5,161,476 | A | * | 11/1992 | Suzuki .............. D05B 35/102 112/306 |
| 5,283,623 | A | * | 2/1994 | Muhlberg .............. D04B 35/20 356/430 |
| 5,684,598 | A | * | 11/1997 | Harke .............. B65H 63/0324 356/430 |
| 9,476,159 | B2 | | 10/2016 | France et al. |
| 9,951,446 | B2 | | 4/2018 | Chen et al. |
| 2007/0291252 | A1 | * | 12/2007 | Berman .................. E06B 9/32 356/73 |
| 2010/0290032 | A1 | * | 11/2010 | Bugge .................. B07C 5/342 356/51 |
| 2013/0077093 | A1 | * | 3/2013 | Hamada .................. D06H 3/00 356/238.3 |
| 2015/0286938 | A1 | * | 10/2015 | Blair ....................... G06F 30/20 706/11 |

OTHER PUBLICATIONS

Haleem et al., Determining the Light Transmission of Woven Fabrics through Different Measurement Methods and Its Correlation with Air Permeability, Journal of Engineered Fibers and Fabrics vol. 9, Issue 4, pp. 76-82, 2014.

Saleem et al., Near Infrared Transmission through Various Clothing Fabrics, Journal of Textile Science Engineering vol. 3, Issue 2, 6 pages, 2013.

Szmyt et al., Light Transmission Through Decorative Knitted Fabrics in Correlation with Their Fabric Cover, AUTEX Research Journal vol. 10, No. 2, pp. 44-48, 2010.

* cited by examiner

TEST METHOD AND DEVICE FOR EVALUATING TEXTILE FABRIC COVERAGE

CROSS-REFERENCE TO RELATED APPLICATION

The present application is based on and claims the benefit of U.S. provisional patent application Ser. No. 62/795,823, filed Jan. 23, 2019, the content of which is hereby incorporated by reference in its entirety.

BACKGROUND

Swimwear and athletic wear are generally constructed of breathable, flexible fabrics that should be colorfast with respect to exposure to, for example chlorinated water. Swimwear is typically constructed from nylon, spandex, or polyester, which may be blended with Lycra or polybutylene terephthalate yarns (PBT) for stretch, combinations thereof or other like materials that are low in moisture absorbance, easily laundered, and retain elasticity. These same considerations apply to athletic wear or "athleisure" clothing.

These materials can to some extent be considered "see-through" when worn, especially as the articles are stretched when worn so as to fit a user tightly. In swimwear especially, the coverage of a user's skin provided by swimwear is generally increased by the inclusion of a liner, at least in specified areas on the swimwear.

The prior testing methods for evaluating textile coverage with respect to swimwear and athletic wear include subjecting the textile to stretch tests which include manually stretching the material to see how far the material will stretch before becoming "see through." The prior methods are dependent on visually observing weak or open spots in the textile or observing thin areas in the article. The prior testing methods for evaluating the textile coverage produce widely inconsistent results for a coverage level provided by the textile, thus providing an inaccurate indication of textile coverage when the product is worn by a user.

The discussion above is merely provided for general background information and is not intended to be used as an aid in determining the scope of the claimed subject matter. The claimed subject matter is not limited to implementations that solve any or all disadvantages noted in the background.

SUMMARY

A method of testing and evaluating a textile for the coverage provided by the textile when incorporated into an article of clothing includes preparing one or more samples of the textile for testing and positioning one of the samples within a path of a beam of light. The beam of light is generated and directed through a center area of the sample for measuring the amount of light transmitted by or through the sample. The amount of light transmitted is compared to a standardized scale for evaluating the amount of coverage provided by the sample as the textile may then be used in the article of clothing. The article of clothing is an article of swimwear, athleisure wear, or athletic wear or combinations thereof.

Measuring the amount of light transmitted by or through the sample includes measuring the amount of light absorbed as a percentage of the light generated by the beam and this is carried out with a spectrophotometer in one embodiment.

In accordance with a further embodiment, a standardized scale is constructed for evaluating a textile for use in articles of clothing constructed from the textile. The method of constructing the standardized scale includes measuring a transmittance of visible light through one or more samples to produce one or more different values reflected of the amount of photons absorbed by the sample from the light beam generated and transmitted. The values range from 0% to 100% photon absorption. The scale includes three categories, where category one identifies substantially opaque samples wherein the value ranges between about 100% to about 60%; category two identifies less opaque to more sheer samples wherein the value is less than about 60% and ranges between about 50% to about 30%; and category three identifying substantially sheer samples wherein the value is less than about 30% and ranges between about 20% to about 0%.

According to one embodiment, the textile sample tested and evaluated according to the methods herein include a first sample that is a single layer of the textile, a second sample that is a single layer of the textile with a single layer of a backing or a liner layer, and in a light color such as white or cream; or a single layer of the textile with a backing or liner layer in a dark color such as brown or black. A third sample is a single layer of textile with two layers of backing or liner in either the light or dark color. A spectrophotometer is used to direct the beam of light through an un-stretched sample and the amount of light transmitted through the textile is measured and may be recorded.

In accordance with a further embodiment, the textile sample tested and evaluated according to the methods herein is mounted in a sample stretching device configured to hold and apply a preselected amount of stretch to the sample during testing. The device includes a frame having a mounting mechanism for securing the frame in the path of the beam of light for testing and a plurality of adjustable sample mounts. One or more of the adjustable sample mounts together secure the sample in a testing state. The adjustable sample mounts are configured for clamping to the sample and are positionable between an extended position and one or more retracted positions. The extended position allows the sample to be secured in a relaxed state to the device. When moved to one or more retracted positions, the adjustable sample mounts stretch the sample from the relaxed state. A first testing state includes the sample in a first stretched state where the sample is stretched a first amount and a second testing state includes the sample in a second stretched state where the sample is stretched a second amount. The sample may also be testing in a relaxed state.

Together, the method of testing, the standardized scale, and sample mounting device provide a more accurate evaluation and indication if the user's skin or undergarments will be readily visible when an article constructed of the textile is worn, whether the article is swimwear or athletic wear.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
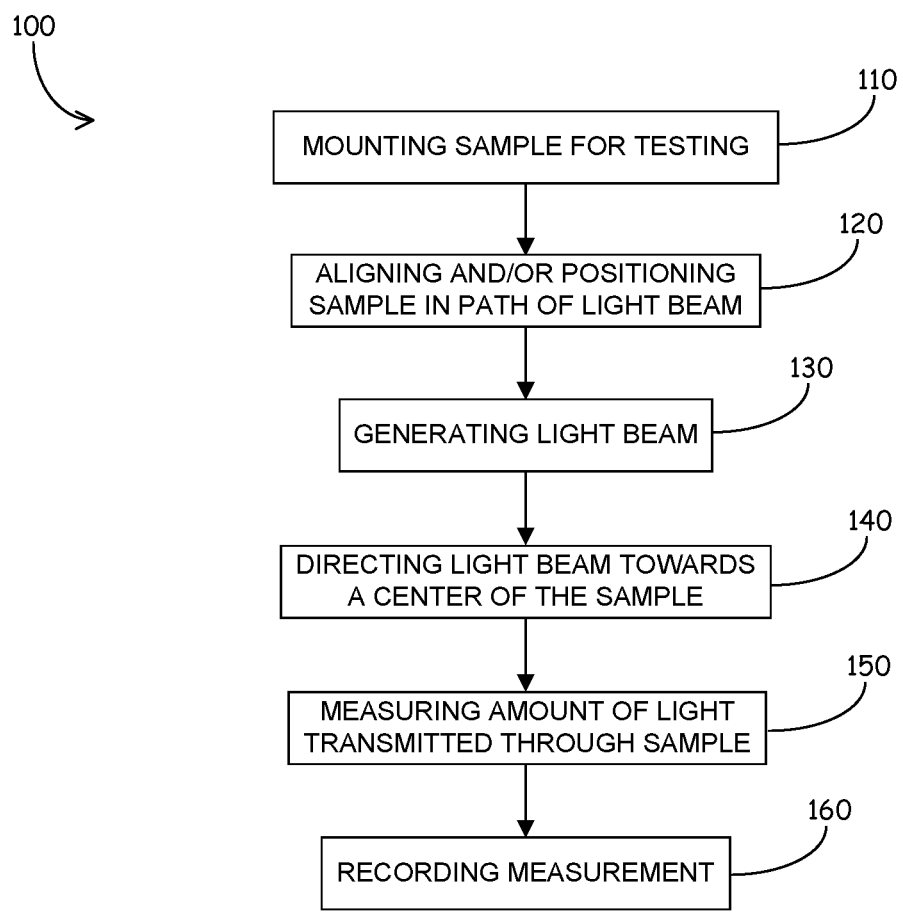
FIG. 1 is a flow diagram of a method of performing a coverage test on one or more sample textile fabrics.

Textile coverage testing and evaluation methods have not been able to consistently or cost effectively measure a textile performance beyond a visual failure or recognition of a "see-through" or "sheer" nature of the textile. The current methods are conducted when an article constructed of the textile, or a sample of the textile, is stretched and visually inspected.

Textiles for use in articles of swimwear or athletic wear are occasionally thin layers of a textile. As the coverage provided by these textiles was not consistently quantifiable, manufactures frequently included a liner or backing to the textile when constructing articles to increase the coverage provided by the textile when it is worn by a user, or to prevent an embarrassing situation where the article is opaque when purchased but see through when worn by a user.

Embodiments described below improve the method of evaluating and testing the coverage provided by textiles that are incorporated into articles of swimwear, athletic or athleisure wear, leggings or similar articles of clothing, including single layer and lined textiles. The methods of testing and evaluation alone or in combination with the device described herein have significantly increased the consistency of the textile coverage evaluation, providing a representative scale for evaluation of the textiles for these end uses. The methods described herein result in consistent evaluation across textiles that are dark and light, where prior methods would otherwise inaccurately predict higher coverage for the dark or light textile materials. The methods of testing and evaluation further produce a significant cost savings to manufacturers by standardization of testing and evaluation for purposes of determining if the textile is suitable for use in articles of swimwear or clothing. This cost savings is passed onto the consumer who also benefits by purchasing an article of clothing providing adequate coverage and preventing returns and customer dissatisfaction with inadvertently sheer or see-through areas in swimwear or clothing that may be noticed by others prior to notice by the user.

In accordance with one embodiment, one or more samples of a textile are prepared and tested for opacity. Opacity is a measure of light attenuation, the fraction of light lost when passing a beam of light through the sample. The sample(s) are exposed to a generated beam of light that is directed to or through the textile sample. The amount of light transmitted by or through the fabric is measured and may be recorded as a percentage correlating to the opacity of the textile. The percent of light transmission and/or light lost when the light beam is directed through the textile is calculated as a percentage of the light emitted from a light source. For example, a spectrophotometer may be used to generate the beam of light and to measure the intensity (percentage) of the light transmitted by or through the textile sample.

As used throughout the specification, what is meant by the term "sheer" or "sheerness" is a textile that is transparently thin or diaphanous as used in connection with textiles or fabrics. The term "sheer" may be used interchangeably herein after with the term "see-through" as related to the transparency (or conversely, the opacity) of a textile.

As used through the specification, the term "stretched" refers to a textile sample being made wider and/or longer without tearing or breaking. That is, the textile is pulled from opposing sides, in or more directions in order to stretch the sample by increasing the length and/or width of the sample.

As used throughout the specification "relaxed" means the textile is not stretched or is otherwise in a standard state. The textile in a relaxed state means the textile is un-stretched, not drawn-out, strained, tightened or taught, beyond a length or width of the textile sample as cut.

As used throughout the specification, what is meant by the term "coverage" refers to the coverage provided to the skin or undergarments of a user wearing the textile in the form of an article, where the article may be swimwear or athletic wear. The amount of coverage can be defined as a scale from zero cover (the textile is clear or transparent etc.) to total coverage (the textile is opaque, cannot be seen through).

Generally, it is desirable for swimwear and athletic wear or athleisure wear to have a higher amount of coverage so that the garments or articles are not see through when worn. This is especially true for children's swimwear. These articles, per their indicated uses and construction, are generally stretchy in nature and intended to fit a user in a "snug" or "tight" manner, so as not to inhibit activity when worn. For example, in some uses, textile samples having an opacity of about 60% or more are desired for use in swimwear and/or athletic/athleisure articles.

An opaque object is neither transparent (allowing all light to pass through) nor translucent (allowing some light to pass through). When light strikes an interface between two substances, in general some may be reflected, some absorbed, some scattered, and the rest transmitted. An opaque substance transmits no light, and therefore reflects, scatters, or absorbs all of it.

Ideally, an opaque textile having zero or nearly zero light transmission would be used for such articles as they are prone to stretching when worn or used by users of different shapes and sizes. Zero or nearly zero light transmission would result in a 100 or nearly 100% opacity reading according to the methods described herein. As such, textiles having opacity values of near zero, or for example, less than about 20% are not suitable for use in most of said articles. As the amount of light transmitted through the textile sample increases above 30%, above 50%, or above 80%, the suitability of use of the textile in swimwear and athletic and/or athleisure articles correspondingly declines in a linear manner as the opacity also declines.

The methods described herein are used to test and evaluate the coverage of textiles or fabrics for use in the construction of swimwear and/or athletic or athleisure wear. The textiles tested may be nylon or polyester, which may be blended with Lycra, spandex, or polybutylene terephthalate yarns (PBT) for stretch, or combinations thereof. Additionally, the textiles may be other like materials that are low in moisture absorbance, easily laundered, and retain elasticity.

FIG. 1 provides a flow diagram for a light transmission test method according to an embodiment described herein. Textile samples subjected to this light transmission test may then be evaluated as described further below. The light transmission test method as described herein comprises subjecting one or more samples of a textile, with and/or without one or more liner layers to a light transmission test method. The light transmission test method can be used alone or with the method of evaluating the textile for textile coverage and fitness for use in swimwear or athletic/athleisure articles as described in further detail below.

The light transmission test of the embodiment described herein includes generating a beam of light and directing the beam of light through one or more textile samples. The amount of light allowed to pass through the textile sample is measured and a recorded. An opacity reading may be provided that inversely correlates to the amount of light transmitted through the textile. That is, when high amounts of light are transmitted through the textile, a low opacity reading is provided, meaning the textile is more sheer than opaque. In one embodiment the opacity is reported by software associated with control and operation of the light beam.

In further detail, the embodiment described in FIG. 1 is a method 100 of light transmission testing which utilizes a spectrophotometer to generate the light beam and to measure the light, if any, transmitted through the textile. The light transmitted through the textile may then be provided or displayed as a percentage, where the percentage relates to the percent of the light directed to the textile that is transmitted through the textile. Additionally or alternatively, the amount of light lost may be measured and recorded by the spectrophotometer. Measurements may be quantified by software available in the field for operating the spectrophotometer and may include the output of an opacity reading where a high opacity reading indicates a more opaque textile while a low opacity reading indicates the textile is more sheer than opaque.

In the embodiment described herein a spectrophotometer is used to generate the light beam and measure the transmittance of light through the textile, however, it is contemplated that the embodiments described herein can be carried out with alternative machines or devices capable of generating a beam of light and directing the light beam to or through the textile sample for measurement of transmission and/or evaluation per a visual standardized scale as described in further detail below. The spectrophotometer may be a Datacolor 650 or similar device. The software used may be Datacolor TOOLS Plus or an equivalent xRite iControl software. The spectrophotometer will also be provided with a calibration black trap and a calibration white tile and the spectrophotometer should be calibrated prior to testing samples according to the methods herein for accurate results.

The textile samples as measured and evaluated according to the methods described herein include cut samples of a textile prepared for measurement. The samples are cut to a size sufficient for securing the sample in a mount or holder in an un-stretched position. The samples are then stretched for testing. The mount or holder may be a holder according to the embodiments described further below. The hold is configured to retain the sample within a path of a generated beam of light for measurement of said sample.

The methods described herein can be used with textile samples comprising a single layer of a textile in any color or pattern, a sample comprising multiple layers of the textile, and/or a sample comprising a layer of the textile and one, two or more layers of a lining or backing material behind the textile. As the textile is positioned in front of a light source so the beam of light is directed through the textile, the lining or backing material would be positioned behind the textile such that the light source is in front of the textile. It is noted however, that said positioning when a textile and liner or backing are used is not required as the transmission or light through the sample will be the same regardless of which side of the sample faces the light source.

The sample(s) prepared may be representative of a potential end use or article constructed of the textile. In one embodiment, it is preferred to that the sample for testing is a single layer of the textile. A single layer is tested according to the methods described herein. In the event the single layer does not meet or exceed a pre-selected threshold for opacity it may be determined that the single layer of the textile does not provide sufficient coverage for purposes of incorporation into an article of athleisure or swim wear. The same textile may be tested again as a second sample comprising two layers of the textile. Again, if this second sample does not meet or exceed a pre-selected threshold for light transmission, it may be determined that the single layer of the textile does not provide sufficient coverage for purposes of incorporation into an article of athleisure or swim wear. A last test may be conducted with a third sample comprising a lining on a back layer of the textile. In a preferred embodiment, a single layer of the textile selected for incorporation into an article of athleisure or swim wear would meet or exceed the pre-selected threshold for light transmission.

Each sample is mounted in front of the beam of light at step 110 so that the beam shines through a center area of the textile sample. In accordance with one embodiment, each sample is placed in the mount for holding the sample in position during transmission and measuring. The mount may be a device 10 as described herein. The mount or device 10 is fixed in a position spaced apart from the light source. At step 120, the sample is aligned and thus positioned directly in a path of the generated light beam. The sample includes the textile being mounted in a stretched state. For example, the textile may be stretched about 25% or about 30% beyond its relaxed length and width. Stretching the sample 25% or 30% is representative of the end use or article construction as the articles described herein stretch when worn.

The samples may additionally be tested in a "wet" or saturated state (exposed to water and/or clear liquid to represent sweat or soaking) and a "dry" state to provide additional evaluation of the textile as described in further detail below. A selected amount of water is applied to the sample prior to testing. The water may be applied to the sample via pipette or syringe to accurately provide a preselected amount of water for consistent testing of samples.

The position of the mount with respect to the distance between the light source itself and the sample can be selected based on the specifications of the machine used, however, if a uniform beam of light is generated, the intensity of the beam of light should be consistent within the confines of the machine and thus the spacing of the sample from the light source should not affect the amount of light transmitted through the sample.

At step 130, the light beam is generated and at step 140 the light beam is directed at a center portion of the sample. The light beam should be directed towards the center portion of the sample to provide consistent measurements as if directed toward an edge portion, the light beam may have a diameter that extends beyond the edge of the textile. At step 150, the amount of light transmitted and/or absorbed when the light is transmitted through the textile is measured and at step 160 the measurement is provided and recorded.

For example, the light transmission through the sample can provided as a measurement of light transmitted, that is as a measurement related to the amount of the light transmitted that is absorbed by the sample. In one embodiment, the spectrophotometer measures the amount of photons (intensity of the light) absorbed as the light beam passes through the sample. Software for operation of the spectrophotometer can report this transmission as an opacity reading as well, where the opacity reading is inversely related to the percentage of light transmitted. That is, a high percentage of light transmitted results in a low opacity reading and vice versa. Thus, a measurement of 100% opacity indicates the textile is opaque and no light has passed through. A measurement of 0% opacity from the spectrophotometer indicates the textile is transparent and all light passes through.

Figure 2:
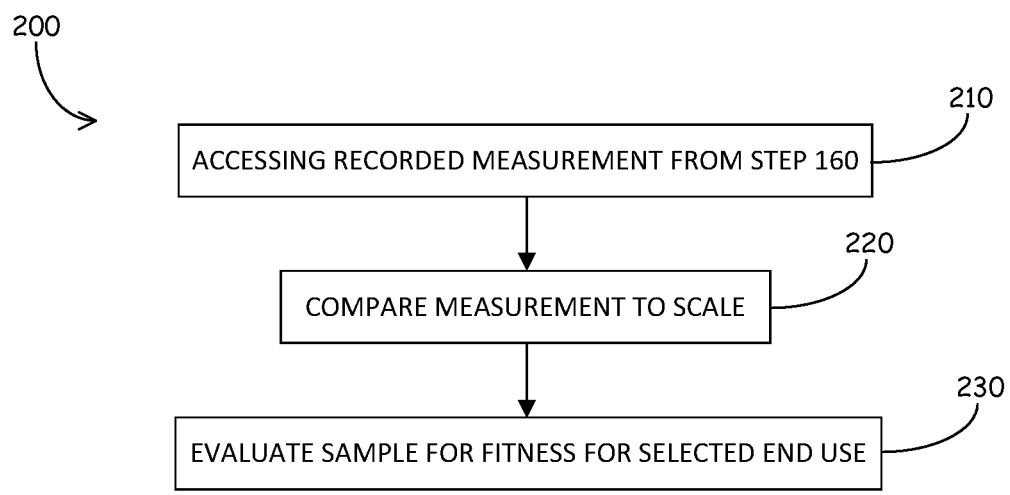
FIG. 2 is a flow diagram of a method of evaluating the samples subjected to a coverage test for determining the suitability of the textile fabric for use in an article.

FIG. 2 provides a flow diagram for a method of evaluating the coverage of a textile sample 200 in accordance with one embodiment. The method comprises subjecting one or more of the samples prepared to light transmission testing as outlined in FIG. 1 and discussed above. The measurement recorded at step 150 is accessed at step 210. At step 220, the measurement(s) recorded. These measurements can then be compared to a scale to ensure that the measurement provided by the spectrophotometer aligns with a corresponding textile sheer, sheerness, or opaque quality. At step 230, the textile is evaluated for coverage and its fitness for use in the construction of swimwear, athletic wear, athleisure wear or other items.

In one embodiment, the spectrophotometer output values reflective of the photon absorbance of the sample accurately reflect the coverage the sample would provide in an article of clothing. For example, the higher the output value, the more opaque or the less sheer a sample is and thus a lower output value indicates that the sample is sheerer. In this embodiment, the output values can be classified into three categories for evaluating the fitness of the sample for use in various articles of clothing. A first category identifies substantially opaque samples as the output value ranges between about 100% to about 60%. A second category identifies less opaque to more sheer samples wherein the value is less than about 60% and ranges between about 50% to about 30% and a third category three identifies substantially sheer samples wherein the value is less than about 30% and ranges between about 20% to about 0%.

Figure 3:
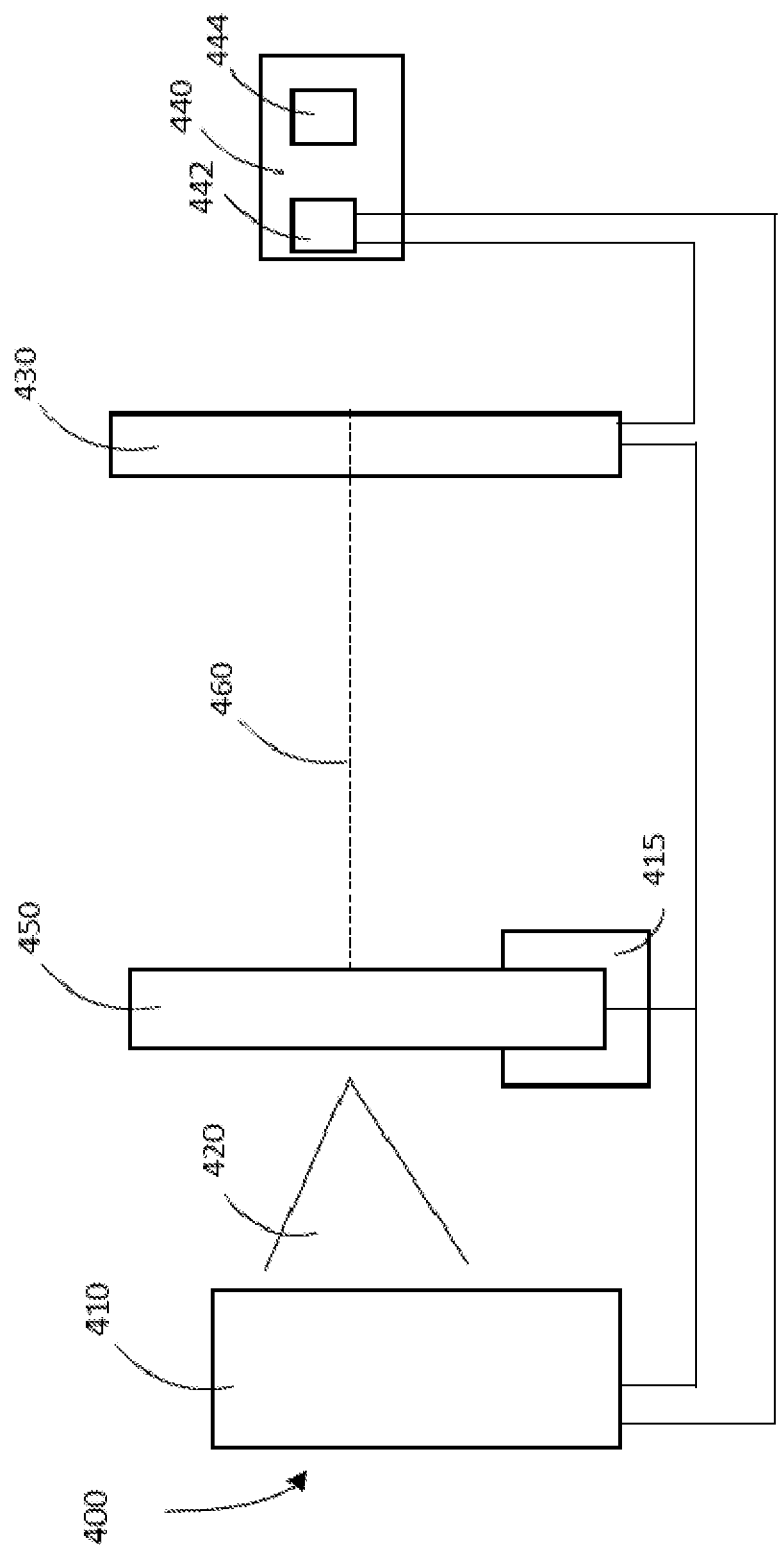
FIG. 3 is a block diagram of a testing apparatus for measuring light transmission of textile samples.

FIG. 3 illustrates an instrument 300 for measuring photon absorbance of a light beam transmitted through the textile. The instrument 300 measures the amount of photons, that is, the intensity of the light absorbed by the textile sample. The light emitted by the instrument can have a wavelength range selected based on the textile or end-use. In one embodiment, a light beam 320 generated by the instrument 300 has a wavelength in the range of about 390 to 700 nanometers, meaning that the light transmitted is visible light. The methods described herein can also measure light over the ultraviolet range (e.g., 185 to 300 nm).

The instrument 300 includes a light source 310 that generates a light beam 320. The light may be collimated by a lens and passed through a monochromator (e.g, a prism) (not shown). The instrument 300 further comprises is detector 330 such as a photocell. The light beam 420 generated is then directed through a textile sample 350 to the detector 330. The instrument 300 may further comprise a sample holder 415 for retaining the textile sample 350 in a path of the beam of light 320. The detector 330 is configured to measure the amount of light transmitted through the textile (or alternatively, the amount of light absorbed by the textile). The amount of light transmitted 360 through the textile is measured and provided as a percentage of the light generated on a digital display or meter 340 on the instrument 300. The display or meter 340 comprises a microprocessor 342 and a display interface 344 for determining and displaying the transmission value measured.

The instrument 300 may be calibrated by running a test without a textile sample in the path of the light beam 320. The calibration allows for determining the intensity of the light beam when measuring transmission and/or where instrument output values are reflective of the photons absorbed, and adjustment or recalibration if needed. For example, if with no sample present, the instrument 300 may provide a reading or measurement of "0" (e.g., no photons are absorbed) and this indicates that 100% of the light beam (collimated light) is detected by the detector 330. If less than 100% is detected, recalibration or cleaning of the lenses etc. in the light source should be performed.

In certain articles of swimwear and/or athletic wear, textiles that absorb a higher amount of the light transmitted by the instrument may be selected. For example, textiles providing a measurement related to photon absorbance of greater than about 60, or more specifically greater than about 70, or more specifically in the range of about 80 to about 100. The methods described herein provide increased consistency in the results of evaluation of coverage provided by a textile. This evaluation is more representative of actual user coverage when the textiles are incorporated into articles of clothing.

In one embodiment, the sample holder 415 used to hold the textile sample during testing of the sample as described herein is a sample stretching device as described below. The sample stretching device provides for consistent and uniform sample testing as samples of a selected size are secured in the device. The sample stretching device then stretches the sample a pre-determined amount for testing. The stretching of the sample during testing provides for opacity readings that are accurately reflective of the opacity of the sample textile incorporated into an article of clothing when worn as the articles are generally intended to stretch during use. The sample stretching device can also be mounted to the housing of the light source for hands-free holding of the textile sample during testing.

Figure 4:
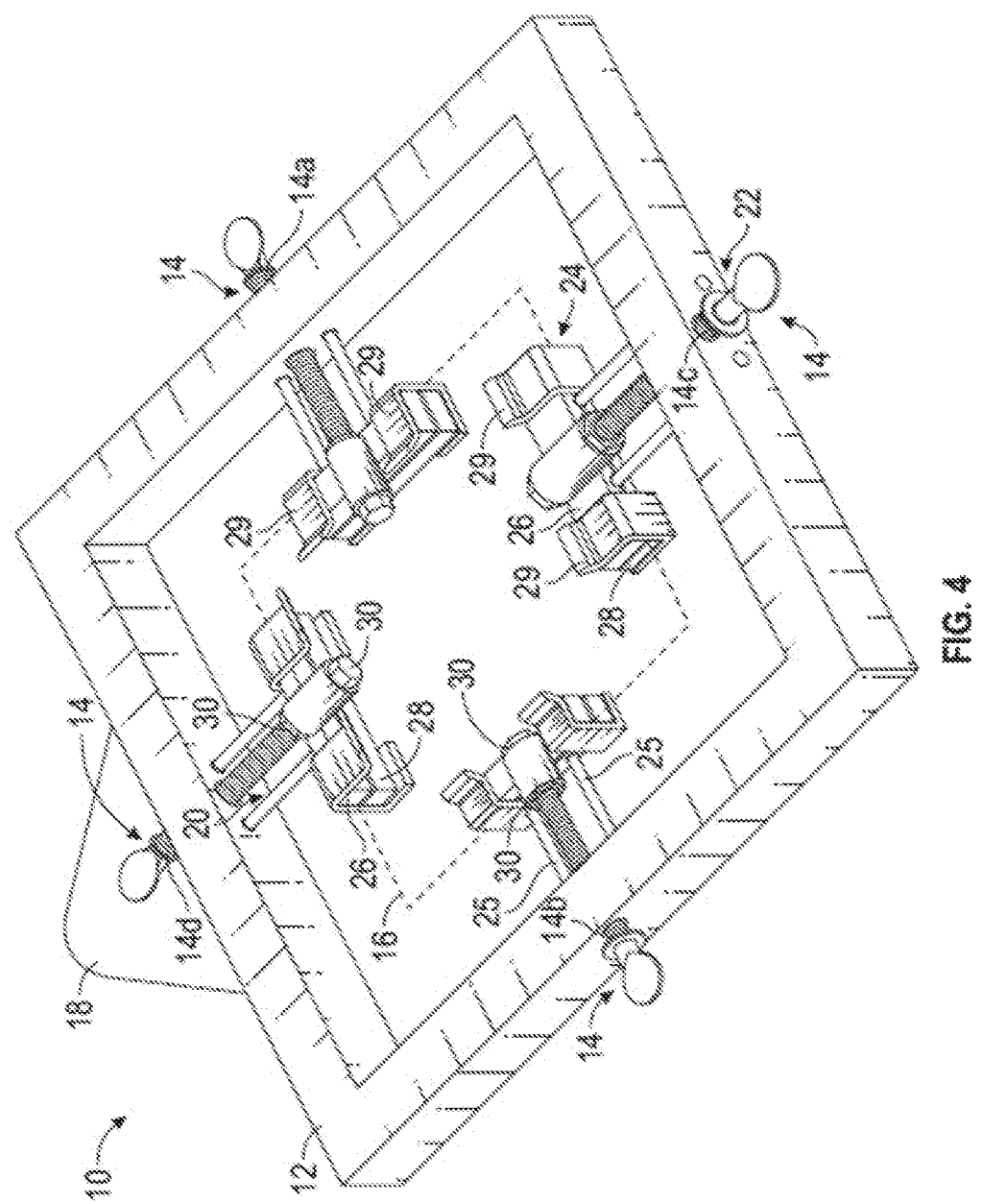
FIG. 4 is a perspective view of a sample textile fabric support device for evaluating the sample textile fabric.

FIG. 4 illustrates a sample stretching device 10 for holding and evenly stretching a textile sample 16 during testing. The sample stretching device 10 includes a frame 12 which supports a plurality of adjustable sample mounts 14. The sample mounts 14 are spaced apart around the frame and are configured to securely hold the textile sample 16 in the frame 12. The sample mounts 14 are adjustable so as to provide one or more sample 16 testing states including one or more stretched states. The textile sample 16 may be one or more of the samples prepared according to the methods described herein.

The frame 12 may be further adapted with a mounting or connection mechanism 18 that is configured to secure the stretching device 10 on or in connection with a housing of the light source for testing such as a spectrophotometer. The connection mechanism 18 may be a semi-circular mount configured to mate with the housing of the spectrophotometer around the light source such that the frame 12 is held in place in the path of the light source during testing.

In the embodiment illustrated, the stretching device 10 includes adjustable sample mounts 14a, 14b, 14c, 14d. The adjustable sample mounts 14a-d are generally provided in adjacent pairs 14a, 14b and 14c, 14d and the mounts 14a, 14b, 14c, 14d of each pair are positioned on opposing sides of the frame 12. The adjustable sample mounts 14 each comprise a proximate end 22 operably secured to the frame 12, and a terminal end 24 extending inwardly from the frame 12. While four mounts 14 are illustrated, a device having two or more mounts is contemplated and any number of mounts may be incorporated to accommodate different sample dimensions and selected degrees of stretching of the sample.

The proximate end 22 of each sample mount 14 extends into and through the frame 12 to operably connect to the frame 12. The terminal end 24 is configured to attach to or otherwise securely hold a portion of the textile sample 16. For example, the terminal end 24 may include a clamp where the terminal end 24 includes a first clamping block 26 and a second clamping block 28. A length of the sample 16 is placed between the clamping blocks 26 and 28 and one or more securing mechanisms such as clips 29 are provided for locking the clamping blocks 26, 28 with the sample 16 therebetween. Inner facing surfaces of each clamping block 26, 28 may be textured to further securely hold the edge length of the sample 16 therebetween when the sample mounts 14 are retracted to stretch the textile sample 16. Each mount 14 may include additional supports 25 which extend from a fixed connection with the frame to a slidable connection with corresponding apertures in a width of the clamping blocks 26, 28, These supports 25 aid in providing even clamping force and positioning along a length of the clamping blocks 26, 28 when the mounts 14 are adjusted. While a clamping mechanism is illustrated, other securing mechanisms configured to hold or secure to the sample are contemplated and within the scope of this disclosure.

Each sample mount 14 further comprises an adjustment mechanism 20 operably connecting the proximate end 22 and the terminal end 24. The adjustment mechanism 20 may be a threaded length for engaging with a threaded aperture in the frame 12 through which the proximate end 22 of the mount 14 extends. The mechanism 20 may also be retracted or extended through the frame 12. The proximate end 22 of mount 14 provides the adjustment mechanism 20 with a knob or handle 23 for adjusting the position of the terminal end 24. For example, turning the knob 23 rotates the adjustment mechanism 20 to linearly displace the terminal end 24 with respect to a center of the frame 12 and thus retract or extend the sample 16 secured thereto.

The adjustment mechanism 20 may include one or more markings 30 corresponding to a degree of stretch. The degree of stretch is applied to the sample 16 when the sample is secured to one or more mounts 14 in the frame 12 and one or more of the mounts 14 is retracted.

The sample mounts 14 may be independently and selectively positionable with respect to the frame 12. Each sample mount 14 can be moved between a plurality of positions where for example, a first position is an extended position for mounting the sample, a second position is a first retracted position for stretching the sample a first amount and a second position is a second retracted position for stretching the sample a second amount, different than the first amount. That is a sample can be loaded into the mount for testing according the methods described herein and a standard amount of stretch can consistently be applied to each sample. For example, stretch values representative of wearing a garment can be in the range of 15% to 35% and more specifically may be about 25% or about 30%.

In the embodiment illustrated, the sample stretching device 10 is configured for holding and supporting a 4 inch by 4 inch textile sample. However, the sample stretching device 10 can be configured to hold larger or smaller samples and operate in substantially the same manner as described herein. Moreover, the device can be configured to provide varying amounts of stretch to the samples, based in part on the selected end use of the textile.

Figure 5:
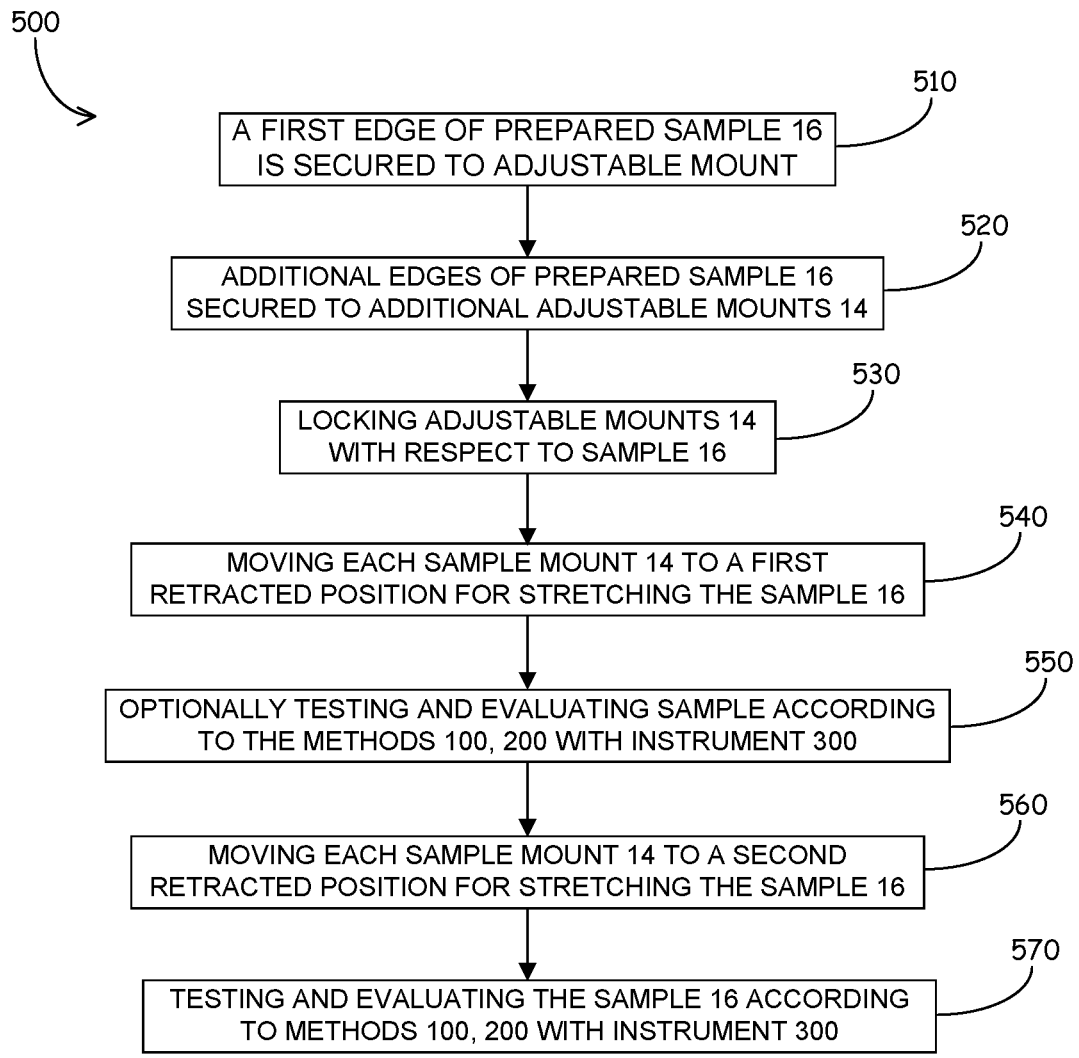
FIG. 5 is a flow diagram of a method of mounting and stretching the sample in the device for performing the coverage test and evaluating the sample.

A method of mounting and stretching the sample 500 is illustrated in FIG. 5. A first edge of the prepared sample 16 is secured between the clamping blocks 26, 28 of a sample mount 14a at step 510. A second, third and fourth edge of the prepared sample 16 are secured between the clamping blocks 26, 28 of a second, third and fourth sample mount 14b, 14c, 14d at step 520. The clamping blocks 26, 28 are secured with clips 29 to hold the sample securely in each sample mount 14a-14d at step 530. The sample mounts 14a, 14b, 14c, 14d are in an extended state during steps 510, 520, and 530. Each sample mount 14a-14d is rotated to move the respective terminal ends 24 to a first retracted position thus stretching the sample 16 at step 540. For example, the first retracted position stretches the sample a total of 25% from the relaxed state in one or both of a length and width. The sample may be tested and evaluated according to the methods 100, 200 described herein at step 550. In addition, or as an alternative to step 550, each sample mount 14a-14d is rotated to move the respective terminal ends 24 to a second retracted position thus stretching the sample 16 further at step 560. For example, the second retracted position stretches the sample a total of 30% from the relaxed state in one or both of a length and width. The sample may be tested and evaluated according to the methods 100, 200 described herein with instrument 300 at step 570.

Retraction of the mounts 14a-14d stretches the textile sample 16 evenly in length and/or width to provide a uniform stretch to the fibers of the sample 16. The degree of stretch is calculated as a displacement of the material from a relaxed state via retraction of one or more adjustable sample mounts 14. For example, if two opposing mounts 14a, 14b or 14c, 14d are retracted to provide stretch in a first reciprocal direction (such as length) of the sample, the mounts 14a, 14b or 14c, 14d are generally retracted equal distances in opposing directions along a same axis. It is also contemplated that the two adjacent opposing mounts 14a, 14b or 14c, 14d are then retracted to provide stretch in a second reciprocal direction (such as width) of the sample are generally retracted equal distances in opposing directions along a second axis, different from the first axis. In the embodiment illustrated herein, the first and second axes are generally perpendicular to one another to stretch the sample uniformly. However, additional pairs of opposing mounts 14 may be spaced around a perimeter of the sample and configured to provide stretch along additional axes different from the first and second axis to stretch the samples in one or more various directions.

When using one or more pairs of opposing mounts, the distance of retraction ($D_R$) for providing a selected amount of stretch to the sample is calculated according to the following equation, per each mount ($D_m$) is calculated by the following equation:

$$L_R \times S = D_T/2 \qquad \text{(Equation 1)}$$

Where $L_R$ is the relaxed length of the sample along the same axis as the pair of mounts and S is the selected stretch, provided as a percentage and $D_T$ is the total distance in which the mounts must be displaced, thus $D_T$ is divided by 2 as each mount in a pair is moved the same amount in opposite directions along the same axis. For a 4 inch by 4 inch sample, each mount 14 will be retracted 0.4 inches to provide an overall stretch of 20%; retracted 0.5 inches to provide an overall stretch of 25%; or retracted 0.6 inches to provide an overall stretch of 30% to the sample.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A method of evaluating a textile for use in an article of clothing constructed of the textile:
    preparing one or more samples of the textile for testing;
    generating a beam of light;
    mounting one of the samples in a device for holding the sample in a stretched state wherein the sample is stretched about 25% or more beyond its relaxed length, its relaxed width, or a combination thereof;
    positioning the sample retained in the stretched state within a path of the generated beam of light;
    measuring the amount of light transmitted through the sample;
    obtaining a value indicative of a sheerness or an opaqueness quality of the sample related to the amount of light transmitted through the sample; and
    selecting one or more samples for use in the article of clothing based on the sheerness or opaqueness value obtained.

2. The method of claim 1 wherein the article of clothing is an article of swimwear, athleisure wear, or athletic wear or combinations thereof.

3. The method of claim 1 wherein the value obtained is representative of an amount of photons absorbed by the sample when the beam of light is directed to or through the sample.

4. The method of claim 1, and using a spectrophotometer for generating the beam of light and measuring the amount of light transmitted through the sample.

5. The method of claim 1 wherein the sample comprises a single layer of the textile.

6. The method of claim 1 wherein the sample comprises a layer of the textile and a layer of a liner or backing material.

7. The method of claim 1 wherein the one or more textiles for use in the article are selected based on the obtained value being in the range of about 80 to about 100.

8. The method of claim 1 and applying an amount of water sufficient to wet the sample such that the sample is saturated when tested.

9. The method of claim 1 and using a standardized scale for evaluating the textile further comprising:
    measuring transmission of visible light through one or more samples to produce one or more different values reflective of photon absorbance by the sample, the values ranging from 0% to 100%; and
    combining the one or more different values of light transmission into at least four categories wherein the categories are reflective of a sheer or opaque quality of the sample.

10. The method of claim 9, and wherein the categories comprise:
    category one identifies substantially opaque samples wherein the value ranges between about 100% to about 60%;
    category two identifies less opaque to more sheer samples wherein the value is less than about 60% and ranges between about 50% to about 30%;
    category three identifies substantially sheer samples wherein the value is less than about 30% and ranges between about 20% to about 0%.

11. The method of claim 9 wherein the article of clothing is an article of swimwear, athleisure wear, or athletic wear or combinations thereof.

12. The method of claim 9, and wherein the light transmission is tested and measured and the values provided with a spectrophotometer.

13. The method of claim 1 wherein the device for holding the one or more samples comprises:
    a frame comprising a perimeter thickness and an open space within the perimeter; and
    one or more adjustable sample mounts spaced apart around the perimeter thickness of frame, the one or more adjustable sample mounts comprising:
        a first end configured for adjusting the position of a second end, where the second end is configured for securing to the sample and a length extending therebetween, wherein the adjustable sample mounts are linearly extendable and retractable with respect to the frame wherein the frame perimeter is fixed.

14. The device of claim 13 wherein the second end comprises a clamp having a top clamping bar and a bottom clamping bar for clamping a portion of the text therebetween.

15. The device of claim 13 wherein rotation of the first end causes linear movement of the second end.

16. The device of claim 13 wherein the second end is moveable between a mounting position, a first testing position configured to stretch the textile a first amount and a second testing position configured to stretch the textile a second amount.

17. The device of claim 13 wherein the frame further comprises a mounting mechanism for removably securing the device to a light source housing for holding the frame during testing.

* * * * *